United States Patent
Kawasaki (10) Patent No.: US 7,542,825 B2
(45) Date of Patent: Jun. 2, 2009

(54) SENSOR FUSION SYSTEM AND VEHICLE CONTROL SYSTEM THEREWITH

(75) Inventor: Naoki Kawasaki, Karlsruhe (DE)

(73) Assignee: Denso Corporation, Kariya (JP)

( * ) Notice: Subject to any disclaimer, the term of this patent is extended or adjusted under 35 U.S.C. 154(b) by 95 days.

(21) Appl. No.: 10/973,073

(22) Filed: Oct. 25, 2004

(65) Prior Publication Data
US 2005/0125154 A1    Jun. 9, 2005

(30) Foreign Application Priority Data
Nov. 28, 2003    (JP)    ............... 2003-400184

(51) Int. Cl.
*G06F 17/18*    (2006.01)
*G06F 15/00*    (2006.01)

(52) U.S. Cl. ............ 701/1; 367/124; 702/181; 280/735

(58) Field of Classification Search ............ 701/1, 701/70, 301, 207, 33; 280/735; 706/52; 702/181, 179, 84; 367/124, 178; 708/805; *G06F 17/18, G06F 15/00*
See application file for complete search history.

(56) References Cited

U.S. PATENT DOCUMENTS

| | | | | |
|---|---|---|---|---|
| 4,578,649 | A | * | 3/1986 | Shupe .......................... 331/78 |
| 5,482,314 | A | * | 1/1996 | Corrado et al. ............. 280/735 |
| 5,661,666 | A | * | 8/1997 | Pawlak ....................... 702/182 |
| 6,076,034 | A | * | 6/2000 | Satoh et al. ................... 701/70 |
| 6,219,640 | B1 | | 4/2001 | Basu et al. |
| 6,415,205 | B1 | * | 7/2002 | Myron et al. ................ 700/275 |
| 6,415,276 | B1 | * | 7/2002 | Heger et al. .................... 706/52 |
| 6,424,960 | B1 | * | 7/2002 | Lee et al. ....................... 706/20 |
| 6,502,042 | B1 | | 12/2002 | Eid et al. |
| 6,516,307 | B1 | * | 2/2003 | Masuoka et al. .............. 706/12 |
| 6,529,891 | B1 | * | 3/2003 | Heckerman .................. 706/52 |
| 6,859,420 | B1 | * | 2/2005 | Coney et al. ................ 367/178 |

(Continued)

FOREIGN PATENT DOCUMENTS

JP    2002-99906    4/2002

(Continued)

OTHER PUBLICATIONS

Wilson, J.D, "Probability of Detecting Aircraft Targets", Aerospace and Electronic Systems, IEEE Transactions on vol. AES-8, Issue 6, Nov. 1972 pp. 757-761, Digital Object Identifier 10.1109/TAES. 1972.309606.*

(Continued)

*Primary Examiner*—Tuan C To
(74) *Attorney, Agent, or Firm*—Harness, Dickey & Pierce, PLC (57) ABSTRACT

Each of multiple probability distribution outputting units computes a probability distribution of a data value detected by the corresponding sensor or algorithm in an image recognition processing or the like. The respective probability distributions of the multiple probability distribution outputting units are given as outputs to a synthetic determination processing unit. Data formats of the outputs to the synthetic determination processing unit can be thereby standardized. Hence, the synthetic determination processing unit is exempted from considering which type of sensor or algorithm each of the outputs is based upon. Even when a sensor or algorithm is added or changed, the same data-fusing algorithm in the synthetic determination processing unit can be uniformly used.

13 Claims, 5 Drawing Sheets

U.S. PATENT DOCUMENTS

| | | | |
|---|---|---|---|
| 2003/0078754 A1* | 4/2003 | Hamza | 702/150 |
| 2003/0088381 A1* | 5/2003 | Henry et al. | 702/127 |
| 2003/0097237 A1 | 5/2003 | Sekiguchi | 702/158 |
| 2003/0105578 A1 | 6/2003 | Takenaga et al. | 257/83 |
| 2003/0112183 A1* | 6/2003 | Szajnowski | 342/465 |
| 2004/0220769 A1* | 11/2004 | Rui et al. | 702/179 |

FOREIGN PATENT DOCUMENTS

| | | |
|---|---|---|
| JP | 2003-84064 | 3/2003 |
| JP | 2003-172780 | 6/2003 |

OTHER PUBLICATIONS

Kaufman, L.M., Dugan, J.B., Johnson, B.W., "On the statistical properties of deterministic simulation models for mobile fading channels", Reliability, IEEE Transactions on vol. 48, Issue 3, Sep. 1999 pp. 292-299 Digital Object Identifier 10.1109/24.799901.*

Office Action Dated Dec. 5, 2006 from corresponding Japanese Application No. 2003-400184.

* cited by examiner

SENSOR FUSION SYSTEM AND VEHICLE CONTROL SYSTEM THEREWITH

CROSS REFERENCE TO RELATED APPLICATIONS

This application is based on and incorporates herein by reference Japanese Patent Application No. 2003-400184 filed on Nov. 28th, 2003.

FIELD OF THE INVENTION

The present invention relates to a sensor fusion system and a vehicle control system therewith. In the sensor fusion system, multiple types of detecting means (e.g., sensors) detect a single detection object and resulting detection values are synthetically evaluated for enhancing accuracy in detection of the detection object.

BACKGROUND OF THE INVENTION

Conventionally, an adaptive cruise control system is developed that automatically adjusts a vehicle speed to control a following distance with a preceding vehicle by measuring the following distance with the preceding vehicle; further, a collision-warning and collision-mitigation system is developed that performs controls such as alarming or braking when a collision occurrence probability is high.

In these systems, detection accuracy has significant importance in recognition devices using a radar sensor or the like that recognizes a position, relative speed, and dimension of the detection object. Therefore, as described in Patent documents 1 to 5, a sensor fusion system is devised. This sensor fusion system includes multiple recognition devices such as a laser sensor recognition unit and an image sensor recognition unit using a camera. Here, the laser sensor recognition unit includes such as a radio-wave type milli-meter-wave radar or a laser radar using an infra-red laser. The detection results from the multiple recognition units are thereby combined to achieve higher accuracy and reliability.

For instance, in a forward-vehicle recognition device in Patent document 1, the radar recognition unit recognizes a following distance, orientation and relative speed, while the image sensor recognition unit recognizes a following distance, orientation, relative speed, vehicle width, and position within a lane. In a synthetic processing unit, when the detected following distances, orientations, relative speeds in the radar recognition unit and the image sensor recognition unit are equal therebetween, it is regarded that the same single vehicle is detected. This result is added to recognition results. Here, as the recognition result, the following distance, orientation and relative speed recognized in common by the radar recognition unit and image sensor recognition unit and the vehicle width and position within a lane recognized by the image sensor recognition unit are outputted by the synthetic processing unit.

Patent document 1: JP-2003-168197 A (US 2003/105578 A)
Patent document 2: JP-2003-151094 A (US 2003/0097237 A)
Patent document 3: JP-2003-84064 A
Patent document 4: JP-2003-172780 A
Patent document 5: JP-2003-99906 A This type of synthetic processing unit is expected to be used in various vehicle types. Here, when the unit is used in the different vehicle types (luxury or public), different functions, different sensors, or different combinations of sensors may be required. Further, a sensor fusion system may be formed by combining various sensors, each of which is provided by a different vendor.

Here, this sensor fusion system potentially involves problems. Typically, the sensor fusion system includes various recognition means including sensors, and a final-staged synthetic determination processing being algorithm that collects and fuses the data outputs from the recognition means. This algorithm is thereby dedicated to the types or combination of the sensors. In other words, each time the combination of sensors or a specification of one of the recognition means is changed, the algorithm of the synthetic determination processing needs reexamining.

It is supposed that as a public-vehicle-oriented drive assist system, an adaptive cruise control system and lane-deviation alarm are mounted in a vehicle. Here, it is expected that a low-priced laser radar, low-resolution camera, and relatively low capability computation circuit constitute a low-priced recognition sensor unit for detecting white lanes and objects. In contrast, for a luxury vehicle, to enhance a function, it is expected that a collision-mitigation system or lane-keeping assist system is mounted in a vehicle. Here, a high environment-resistance milli-meter wave radar, high-resolution camera device having a dynamic range, and high capability computation circuit may constitute the recognition sensor unit for detecting white lanes and objects. Further, for a middle-class vehicle, a different combination having a slightly low capability and price may be adopted.

In this situation, if algorithm for the synthetic determination processing needs developing with respect to each of the combinations, the development cost will become high. Further, even when a recognition algorithm or the like that is a mere small part of the system is changed, the overall algorithm for data fusion must be reexamined.

SUMMARY OF THE INVENTION

It is an object of the present invention to provide a sensor fusion system where versatility and reusability are superior and a vehicle control system therewith.

To achieve the above object, a sensor fusion system is provided with the following. A plurality of detecting units are provided. Each of the detecting units detects a data value of a given data kind. A plurality of outputting units are provided. Each of the outputting units computes a probability distribution of the data value detected by a corresponding detecting unit included in the plurality of detecting units, and then outputs the computed probability distribution. Here, the probability distribution of the data value indicates likelihood to a true value of the given data kind. A synthetic determining unit is provided for estimating a most likely data value of the given data kind based on the probability distributions outputted from the outputting units.

In this structure, the multiple detecting units detect the data values of the given (desired) data kind and the corresponding outputting units output the probability distributions of those data values, respectively. Namely, the detecting units do not give the detection data such as a position, size, or the like that is directly detected. Instead, the detecting units obtain the likelihoods with respect to the true value of the data kind, respectively, and give them to the synthetic determining unit. The likelihood is a probability distribution that exhibits how much degree the data value can be trusted. Thus, the output form of the data outputted to the synthetic determining unit is standardized, so that the synthetic determining unit does not need considering what type of detection unit provides the detection result. As a result, even when any type of detecting unit can be combined, the same data fusion algorithm can be adopted without change.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
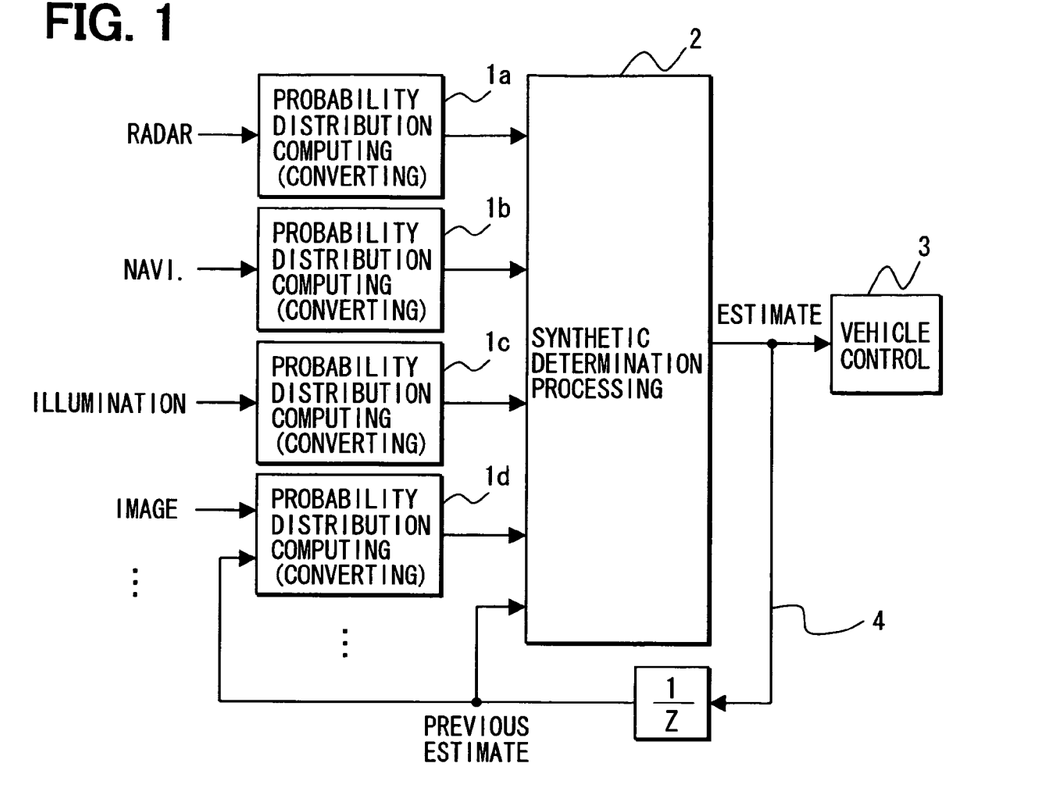
FIG. 1 is a diagram of a schematic structure of a drive-assist control device according to an embodiment of the present invention.

FIG. 1 shows a structure of a drive-assist control device 10 according to an embodiment of the present invention. As shown in FIG. 1, the device 10 mounted in a vehicle includes detection units (or detecting units) such as a milli-meter wave radar, a navigation device, an image recognition device including a camera, an illumination sensor or the like. Other detection units (not shown) are a rain drop sensor, a vehicle speed sensor, a steering angle sensor, which detect data used for detecting vehicle traveling states or traveling environments.

The milli-meter wave radar computes a distance, relative speed, and orientation to a preceding vehicle or obstacle that exists forward of the vehicle based on the result of receiving and transmitting milli-meter waves, further computing wave strength of the received milli-meter wave. The computed data values are outputted.

The navigation device detects a current position of the vehicle and outputs a data value relating to a road type corresponding to the detected current position.

The image recognition device performs image processing for image signals of an image taken from within a given region forward of the vehicle to thereby detect, for instance, a type of a preceding vehicle, a following distance with the preceding vehicle, a size (width, rear width ends, center of the rear width) of the preceding vehicle, a width of a white lane or the like.

The illumination sensor outputs data values corresponding to brightness outside the vehicle. The outputted data values are used, for instance, for adjusting likelihood of the recognized result.

The data values detected by the respective detection units are inputted to the corresponding probability distribution computing and outputting units $1a$ to $1d$, which then compute to output probability distributions indicating likelihoods of the respective data values.

The computing method for the probability distribution in the probability distribution computing and outputting units $1a$ to $1d$ will be explained later in detail. Here, in FIG. 1, each detection unit corresponds to a signal probability distribution outputting unit. However, as the above-described image recognition device, when data values of multiple data kinds (e.g., the type of the preceding vehicle, the following distance with the preceding vehicle, the size of the preceding vehicle, the width of the white lane or the like) are detected by each detection unit based on the image signals, probability distributions are computed with respect to each of the multiple data kinds.

The probability distributions outputted from the probability distribution computing and outputting units $1a$ to $1d$ are inputted to a synthetic determination processing unit (or synthetic determining) 2. When the synthetic determination processing unit 2 receives the multiple probability distributions of the data values of the same data kind, the synthetic determination processing unit 2 computes the (multiplication) product of the multiple probability distributions to thereby fuse the data values. Namely, a data value having the maximum (highest) probability in a resulting probability distribution as a result of the product is estimated as the most likely data value of the data kind. Here, the probability data representing the maximum probability is also outputted. The processing in the synthetic determination processing unit 2 will be explained later in detail. FIG. 1 includes, in the synthetic determination processing unit 2, a feedback loop 4, where a this-time outputted data value is inputted to the synthetic determination processing unit 2 or the like as a previous-time estimate value.

The synthetic determination processing unit 2 provides its output to a vehicle control unit 3. The vehicle control unit (or in-vehicle control unit) 3 includes a drive-assist control device such as an adaptive cruise control system, a collision-mitigation system etc. Namely, based on the output from the synthetic determination processing unit 2, the drive-assist control device performs drive assist by as follows: providing information to a driver; outputting warning: controlling vehicle traveling or driving states by operating a brake or throttle valve; activating a safety device or occupant protecting device such as an airbag or seat belt; or controlling steering force of an electromotive steering device. When this drive assist device is mounted in a vehicle, a type or capability of an adopted sensor is expected to be varied depending on a type of the vehicle. In the sensor fusion system of this embodiment, differences (or types) of the sensors do not need considering, so that this sensor fusion system can be preferably adopted in a vehicle.

Next, the probability distribution outputting units $1a$ to $1d$ that compute probability distributions indicating data likelihood to thereby output it, will be explained in detail below. Here, methods to compute probability distributions from detected data values will be explained depending on discrete data values or continuous data values.

For instance, a milli-meter wave radar detects a distance, relative speed, orientation or the like with a reflecting object as unique values based on results of receiving or transmitting. The distance, relative speed, orientation or the like are continuously varied according to a relative position or speed between the subject vehicle and the reflecting object. This type of sensor detects data having as a state amount continuous values as the unique value. The method that is used in this type of the sensor for converting the detected data values into a probability distribution (correctly, likelihood) will be explained below.

A representing form for the probability distribution adopts a form where a Gaussian distribution and a uniform distribution are combined while an outputted data value is set to a center. The reason why this representing form is adopted is that the sensor has possibility of detecting an incorrect data value and outputting it, and that data values detected by the sensor are assumed to exhibit a distribution having a certain standard deviation.

For instance, suppose that a sensor detects an angle $\alpha$ as a data kind indicating an orientation of a reflecting object, and that a mis-recognition probability of the sensor is 20% and a standard deviation is 0.4. Here, the mis-recognition probability of the sensor means a probability that the sensor recognizes an incorrect object. In this case, the probability distribution is formed of a combination of a uniform distribution component (20%) and a Gaussian distribution component (80%) that has a standard deviation and a center at the detected data value of an angle a. Namely, the uniform distribution component (an integral area of a portion B in FIG. 2) shares 20% of the whole, while the Gaussian distribution component (an integral area of a portion A in FIG. 2) shares 80% of the whole.

The mis-recognition probability and standard deviation are obtained by a definition or property of the sensor or aggregation of the actual detection results.

By contrast, the data having as a state amount discrete (or dispersed) values such as a vehicle type can be outputted in a form of a probability distribution described below. The vehicle type is used as an example of data having discrete values as a state amount. The vehicle type is determined, for instance, by image processing algorithm performing template matching with image signals detected by a camera.

For instance, suppose that the vehicle type includes "passenger vehicle," "truck," "bike," "person," "barrier," and "other." Outputting a vehicle type in a probability distribution form means that the corresponding likelihoods are represented as "3%, 1%, 10%, 50%, 30%, 6%" to the vehicle types, respectively. Here, the total of "3%, 1%, 10%, 50%, 30%, 6%" becomes 100%.

For instance, when the image processing algorithm outputs a single result of "passenger vehicle," this result is converted into a probability distribution as follows.

Firstly, the past results that the algorithm outputs "passenger vehicle" as a vehicle type are collected. Which vehicle types the relevant objects outputted as "passenger vehicles" are actually classified into, are then aggregated within the past results. As a result, for instance, "90% of the relevant objects are actually classified into 'passenger vehicle,' 2% of the relevant objects are actually classified into to 'truck,' . . . " is obtained as an aggregated result. Based on the aggregated result, a probability distribution converting unit is formed within the probability distribution outputting unit. Namely, when the algorithm outputs the vehicle type as "passenger vehicle," the probability distribution converting unit outputs a probability distribution of "90%, 2%, . . . "

Further, a reverse method can be adopted. Firstly, the various images of "passenger vehicle" are inputted into the image processing algorithm performing template matching. To which vehicle type the inputted images are classified are statistically aggregated. Here, for instance, distribution data such that 80% are classified into the passenger vehicle, 10% are classified into the truck, . . . is aggregated. Similarly, with respect to images of "truck," "bike," etc., distribution data are aggregated. When the distribution data with respect to the entire types are aggregated, it means that a probability distribution function being distributed over two variable axes is obtained. Further, the probability distribution function is a combined probability distribution function P(outputted type|true type), so that, in the next step, a function is computed that has the reverse input variable axes. Namely, the function P (true type|outputted type) that obtains a true type when the outputted type is known, is computed. The distribution of the function is easily formed by typically multiplying a normalization constant that is determined by a value of the variable in the reversed condition.

The above-described probability distribution converting unit can be designed regardless of the sensor type, data type (discrete or continuous). It is because the probability distribution converting unit is formed based on the distribution data statistically re-arranged from data values detected in the past and because no outputs whose results cannot be statistically arranged. This is the most significant advantage of this method and the reason why outputs are exempted from dependence on the sensor type or data type.

Further, the variable of inherently continuous data value can be treated as the discrete values. For instance, a solar radiation amount is converted into discrete values by re-defining the solar radiation amount detected by the illumination sensor into "direct sunshine," "cloudy," "dusk," etc. Regardless of the discrete or continuous value, when the states of the variable are defined as mutually discriminated and exhaustive states (by all means, one of the states exists), the variable is eventually represented as the state probability aggregation totaling 100%.

The probability distribution of the data values detected by the detecting unit is obtained by the above-described methods and then outputted to the synthetic determination processing unit 2.

Suppose that the probability distributions of the data values obtained by the probability distribution outputting units 1$a$ to 1$d$ are outputted. Here, when map data corresponding to the shapes of the probability distributions are formed, the probability distribution can be the most truly represented, but the data volume becomes remarkably large between the probability distribution outputting units 1$a$ to 1$d$ and the synthetic determination processing unit 2. Hence, in this embodiment, the probability distributions are represented by scalar amounts and outputted from the probability distribution outputting units 1$a$ to 1$d$ to the synthetic determination processing unit 2.

For instance, when the probability distribution is represented as the sum of a Gaussian distribution and a uniform distribution, the probability distribution is represented by three scalar amounts of an "average" of the Gaussian distribution; a "variance" of the Gaussian distribution; and "normal recognition ratio" indicating a ratio between the Gaussian and uniform distributions.

Figure 2:
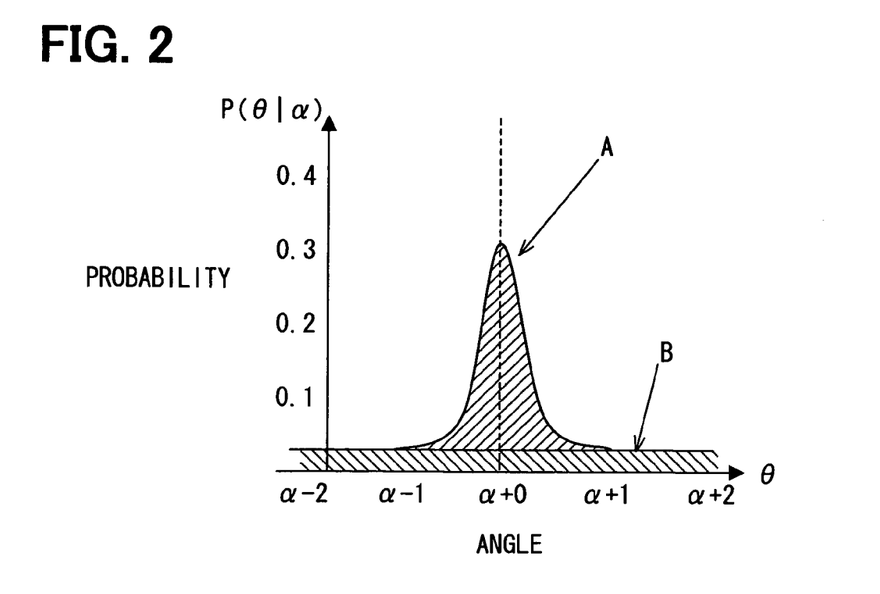
FIG. 2 is a graph showing a probability distribution represented by combining a Gaussian distribution and uniform distribution.
Figure 3A:
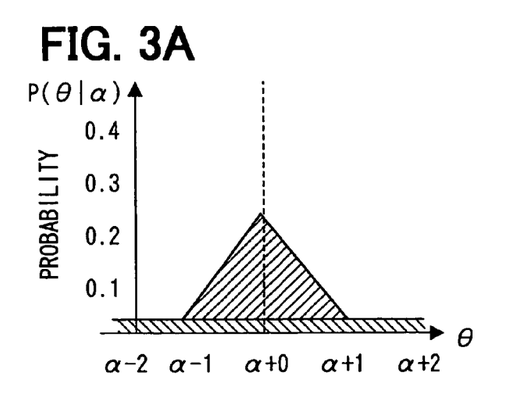
FIGS. 3A to 3D are graphs showing probability distributions represented by other than a combination of a Gaussian distribution and uniform distribution.
Figure 3B:
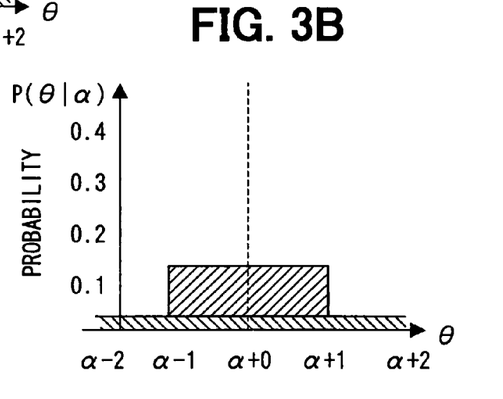
Figure 3C:
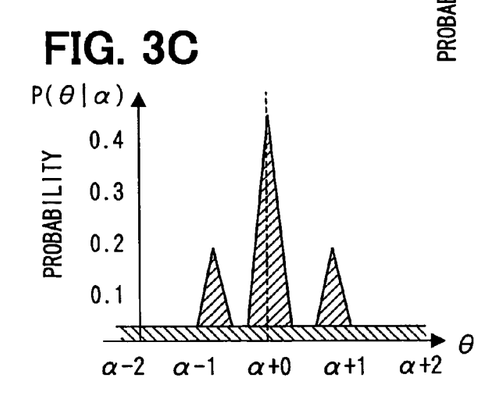
Figure 3D:
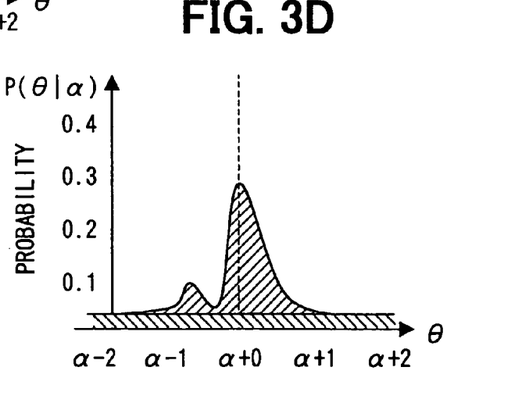

Here, the Gaussian distribution corresponds to a portion A in FIG. 2, while the uniform distribution corresponds to a portion B in FIG. 2. The peak of the Gaussian distribution is defined by the "average." The spread of broad base of the Gaussian distribution is defined by the "variance (or standard deviation)." The thickness of the uniform distribution or the vertical scale of the Gaussian distribution is defined by the "normal recognition ratio (or mis-recognition ratio)." This structure can show both of a possibility of outputting an incorrect data value, and a standard deviation indicating a possibility of true value's distribution.

Further, the probability distribution outputting units 1$a$ to 1$d$ can output probability distributions other than the combination of the Gaussian distribution and uniform distribution. FIGS. 3A to 3D show graphs of examples of the probability distributions other than the combination of the Gaussian distribution and uniform distribution. In these probability distributions, scalar amounts different from the "average," or "variance" are used.

Figure 4A:
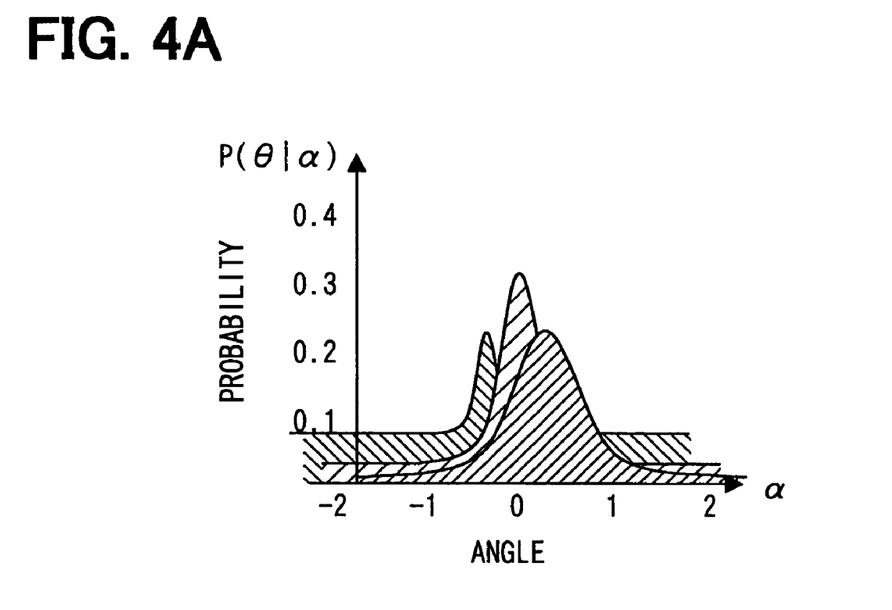
FIG. 4A is a graph simultaneously showing multiple probability distributions relating to a single data kind.
Figure 4B:
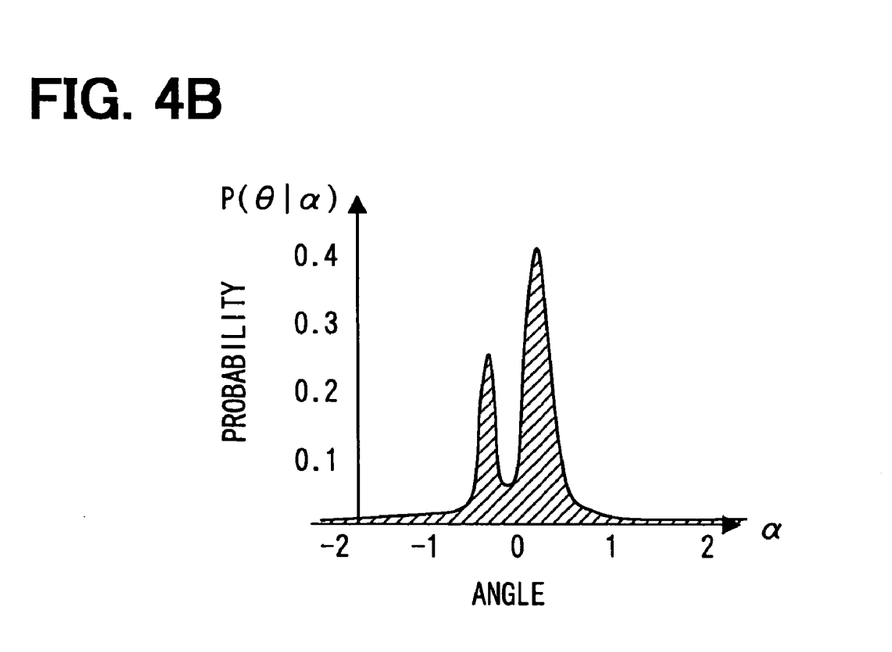
FIG. 4B is a graph showing a probability distribution as a result of multiplication (product) of multiple probability distributions.

Next, the synthetic determination processing unit 2 will be explained below. The synthetic determination processing unit 2 reproduces the probability distributions based on the received scalar amounts when the probability distribution outputting units 1*a* to 1*d* output the probability distributions by the scalar amounts. Then, the product of the reproduced probability distributions that have the same data kind (angle) are computed as shown in FIGS. 4A, 4B to fuse the data values. Namely, the data value having the maximum (highest) probability in a probability distribution (shown in FIG. 4B) as a result of the product is mathematically assumed as the most likely data value. The rationale of this assumption will be explained below.

Suppose that a true value is x, observation results are x1, x2, . . . , and any one of the observation results is independent from another observation result. Here, typically, a combined probability density function is shown as follows:

$$P(x, x1, x2, \ldots) = P(x)P(x1|x)P(x2|x) \quad \text{Formula 1}$$

Here, P(x|x1) is a conditional probability that a probability is x when x1 is obtained.

When the observation result is obtained, a true value is estimated by P(x|x1, x2, . . . ), which is modified with the Bayes' formula as follows:

$$P(x|x1, x2, \ldots) = \{P(x)P(x1|x)P(x2|x) \ldots \}/\{P(x1)P(x2)\ldots\} \quad \text{Formula 2}$$

The denominator becomes a constant for normalization, so that it can be neglected. Further, P(x) is a prior probability of the true value x and cannot be located anywhere. It thereby becomes a uniform distribution and equivalent to multiplication of a constant, so that it can be also neglected. As a result, this probability distribution is represented as the product of P(x1|x), P(x2|x), . . .

For instance, P(x1|x) is a two-variable function formed by the basis of passed statistical data of "how x1 is probabilistically distributed when x is obtained." Further, since x1 is given, it becomes a likelihood function of "where the true value exists with the most likelihood when x1 is given." Therefore, when the true value x is estimated from the multiple observation results, it is represented by the product of the likelihood functions obtained from the respective observation results.

Hence, when output results based on the data detected by the respective detection units 1*a* to 1*d* are outputted in forms of likelihood functions (probability distributions), the processing in the synthetic determination processing unit 2 becomes the simple multiplication while the obtained result has the mathematic rationale. This exhibits an advantage that the obtained result has high accuracy and general versatility.

Further, the synthetic determination processing unit 2 adopts as the most likely data value the data value that has the highest probability in the resulting probability distribution of the product of the probability distributions outputted from the multiple probability distribution outputting units 1*a* to 1*d*.

Namely, when a single value must be selected from the probability distributions outputted from the probability distribution outputting units 1*a* to 1*d*, the synthetic determination processing unit 2 adopts as the final output the data value that has the highest probability in the resulting probability distribution of the product of the probability distributions outputted from the multiple probability distribution outputting units 1*a* to 1*d*. This remarkably simplifies the algorithm for obtaining the final output. This also minimizes the total risk when the expected risk in incorrectly selecting other than the true value is assumed to be the same in selecting among other than the true value.

In detail, suppose that a loss is λ(xj|xi) when a true value is xi and the true value is outputted as xj. Also, simultaneously suppose that a total risk is R(xi|xv) when the observation vector xv is obtained and the true value is outputted as xi.

$$R(xi|xv) = \Sigma \lambda(xi|xj)P(xj|xv) \,(\Sigma \text{ is applied to entire } j) \quad \text{-Formula 3}$$

Here, when it is defined that λ(xj|xi)=0 when i=j, while λ(xj|xi)=1 when i≠j, the total risk R(xi|xv) is shown as follows:

$$R(xi|xv) = \Sigma P(xj|xv) \quad \text{Formula 4}$$
$$= 1 - P(xi|xv)$$
$$(\Sigma \text{ is applied to entire } j \text{ excluding } j = i)$$

The result of Formula 4 is an average error probability. The decisive rule that minimizes the total risk R is to maximize the prior probability P(xi|xv). Namely, adopting the decisive rule of "xi is determined when P(xi|xv)>P(xj|xv) under entire j but j≠i" results in the achievable maximum performance.

The product of the probability distributions always becomes a probability distribution as shown in FIGS. 4A, 4B. Regardless of the discrete or continuous data value of the data kind (variable), the data value corresponding to the maximum probability can be extracted. The multiplication of the probability distributions and the assumption of the most likely data value will be explained below.

For instance, suppose that one outputting unit outputs the probability distribution of the vehicle type as "3%, 1%, 10%, 50%, 30%, 6%," and another outputting unit also outputs the probability distribution of the vehicle type as "3%, 1%, 10%, 50%, 30%, 6%." Here, the both probability distributions are multiplied to compute the product and-normalized to be totaling 100%, so that a probability distribution of the result becomes "0.25%, 0.03%, 2.82%, 70.50%, 25.38%, 1.02%." The fourth type of "70.50%" is extracted as the most likely data value.

Thus, when multiple information items are collected in forms indicating the likelihood that "the true type may be this" from the probability distribution outputting units 1*a* to 1*d*, simply computing the product of the multiple probability distributions enables the resulting probability distribution to have the maximum in any state (type). Further, when multiple states (types) have the same maximum, any one of them can be extracted.

The vehicle type is detected not only by performing the template-matching image-recognition algorithm, but also based on the vehicle width that is expected as a result of image recognition or radio-wave strength of the milli-meter wave. Namely, for instance, once the vehicle type is designated as "passenger vehicle," the radio-wave strength or width can fall within a certain range. On the contrary, once the width is designated, the vehicle-type probability distribution that indicates which type is the most likelihood can be obtained.

Similarly, the road type is detected directly by "road type information from a navigation system, and is detected or expected indirectly by "lane width by white-lane recognition." In this case, the probability distribution that exhibits the likelihood of the various detection results can be also obtained.

Further, the solar radiation amount of one of the traveling environments is detected individually by "illumination sensor," "wiper ON/OFF signals," "average illumination value determination algorithm for the whole screen by the image processing," "hours" etc. The probability distribution that exhibits the likelihood of the various detection results can be also obtained.

Furthermore, the road state (or road surface state) of one of the traveling environments is detected individually by "illumination sensor," "wiper ON/OFF signals," "outside air temperature," "road state recognition algorithm by the image processing," "information from an infrastructure via a road-vehicle communications" etc. The probability distribution that exhibits the likelihood of the various detection results can be also obtained.

Figure 5:
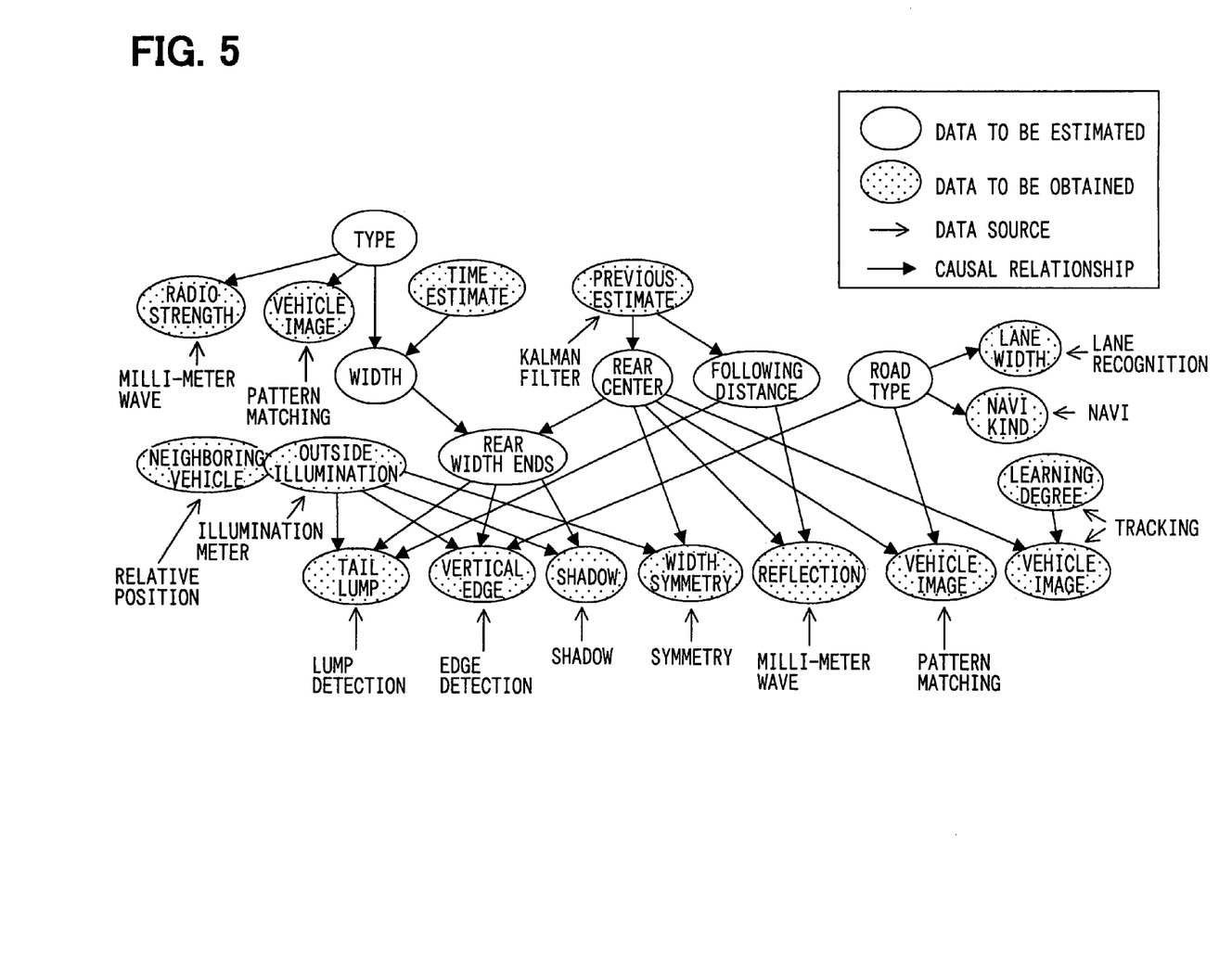
FIG. 5 is a diagram showing an example of a causal relationship of variables.

An example of the above-described causal relationship between the various variables is shown in FIG. 5. The circles represent variables (nodes), while the arrows between the nodes represent causal relationships with the direction being from the causes to results. The blank circles represent data to be preferably estimated, while the dots-having circles represent data to be obtained with algorithm names or the like as data sources being represented with arrows. Here, the arrows do not show data flows, but show the existence of the relationships between the parent and child nodes. Namely, for instance, when the data value of the child node becomes clear, it is assumed what the data value of the parent node is. The information can be carried reversely to the directions of the arrows. Vice versa, the information can be carried to the directions of the arrows. Further, the information can be carried to nodes by tracking the arrows.

With reference to FIG. 5, it is easily expected that which variable affects the likelihood. For instance, with respect to the above-described vehicle type, the node of "TYPE" is connected with three nodes of radio-wave strength (how high the reflecting radio-wave strength of milli-meter wave is), vehicle image (which vehicle-type-template image the image of the target object resembles), and width. When the vehicle types are measured or (detected) respectively by the wave-strength and image matching, the corresponding probability distributions (likelihoods) are then outputted, respectively. Further, the vehicle type is expected from the width, so that the corresponding probability distribution is outputted. On the contrary, when the vehicle type is designated, the width can be narrowed down. Both affect each other.

Namely, the result derived from the tail lump recognition by the image processing varies the probability distribution of the position of "REAR WIDTH ENDS," so that the width can be further narrowed down. Moreover, it affects the probability distribution of the vehicle type. On the contrary, when the probability of "truck" is expected to be high by the pattern matching, the range of the width can be narrowed down by the probability of the type. The probability distributions outputted from the respective probability distribution outputting units 1a to 1d are combined by the synthetic determination processing unit 2 with a model integrating the causal relationship. This eventually computes the probability distribution of the data value of the data kind (variable) that is to be preferably estimated.

Further, the probability distributions outputted from the respective probability distribution outputting units 1a to 1d are dynamically varied depending on the detection accuracy of the detection units. Namely, each of the probability distribution outputting units 1a to 1d memorizes a condition where the detection accuracy decreases, and a database that statistically aggregates the corresponding decreasing degrees.

For instance, in the image recognition device, the probability distribution outputting unit 1d memorizes as a database (function) a relationship between darkness and a mis-recognition ratio. The data relating to "darkness" is inputted to the probability distribution outputting unit 1d. Here, in FIG. 1, the data relating to "darkness" estimated by the synthetic determination processing unit 2 is inputted to the probability distribution outputting unit 1d; however, the detection value of the illumination sensor can be also directly inputted to the probability distribution outputting unit 1d.

The probability distribution outputting unit 1d of the image recognition device dynamically varies the probability distribution of the data value detected by the recognition processing in the image recognition device based on the data value relating to "darkness."

Figure 6A:
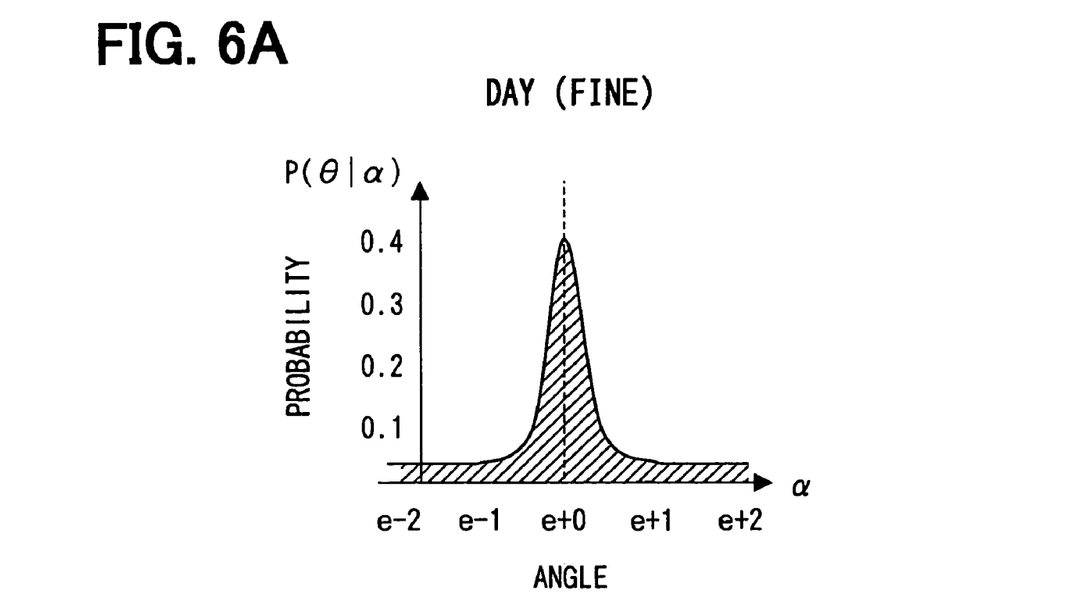
FIG. 6A is a graph showing a probability distribution of a data value detected by an image recognition processing while it is light.
Figure 6B:
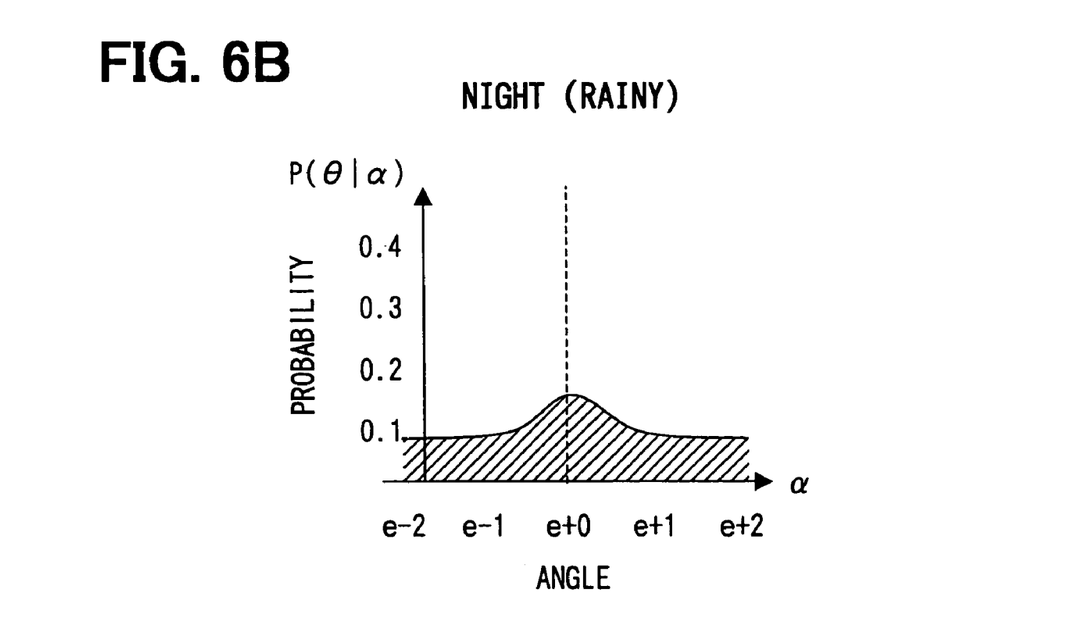
FIG. 6B is a graph showing a probability distribution of a data value detected by an image recognition processing while it is dark or rainy.

FIGS. 6A, 6B shows an example of the probability distribution that is varied based on the data value relating to "darkness." In FIG. 6A, the probability distribution of the data value is detected by the image recognition processing in a bright background, while, in FIG. 6B, the probability distribution of the data value is detected by the image recognition processing in a dark background or rainy day.

For instance, suppose that the image recognition device perform image processing and outputs a probability distribution as a detection result and that recognition capability in "darkness" be inferior to that in "brightness." Here, when data indicating "darkness" or nighttime is provided, the outputted probability distribution is decreased compared with that in "brightness" or daytime. In the extreme case, thoroughly uniform distribution or a very slightly increased probability may be outputted.

Further, when the single probability distribution outputting unit 1d outputs the decreased probability distribution and another probability distribution outputting unit outputs a relatively high probability distribution, the synthetic determination processing unit 2 uses the outputted relatively high probability distribution by weighting it. The estimate accuracy of the data value in the synthetic determination processing unit 2 can be thereby enhanced.

Here, the data relating to "darkness" affecting the detection accuracy in the image recognition device is given to the probability distribution outputting unit 1d instead of the synthetic determination processing unit 2, so that the probability distribution is varied based on the given data in the probability distribution outputting unit 1d. Therefore, even when the detection accuracy in the detecting means of the image recognition device or the like is varied, the influence is limited within the closed area constituted by the detecting means and the probability distribution outputting units 1a to 1d. This does not thereby affect the processing in the synthetic determination processing unit 2, which does not need varying.

The detection accuracy in the sensors as the detecting means or the recognition algorithms such as the image recognition processing or the like is varied by the corresponding different condition. Therefore, to vary the probability distributions outputted by the probability distribution outputting units 1a to 1d, the respective probability distribution outputting units 1a to 1d need to retrieve the respective data relating to the critical parameters affecting the detection accuracy.

As explained above, the synthetic determination processing unit 2 computes the product of the multiple probability distributions to obtain the probability distribution as the result and outputs the data value that corresponds to the highest probability. Here, the synthetic determination processing unit 2 also outputs the data of the highest probability as the reliability data. It means that the data value along with the reliability data is outputted. Even when the multiple control devices receive the relevant output, the data value of the relevant output can be standardized without depending on the types of the control devices nor the number of the control devices. Namely, the control devices as recipients of the outputs also receive the reliability data, so that the control devices can determine whether accuracy required for performing the relevant control is satisfied or not. Hence, even when the control devices have different accuracy requirements, respectively, different data that is dedicated for each of the control devices is not required. This enhances operating efficiency in installation of the various control devices.

Here, the reliability data can include at least one of: an error probability; a correct answer probability; a probability distribution; an average of the probability distribution; a variance of the probability distribution; and a normal recognition ratio. In particular, when the synthetic determination processing unit 2 computes the product of the multiple probability distributions and adopts the data value that has the highest probability in the resulting probability distribution as the most likely data value, the highest probability is preferably outputted as the reliability data. Without the especial computation, this can output the reliability data that is easily and objectively understood as the index of the reliability.

It will be obvious to those skilled in the art that various changes may be made in the above-described embodiments of the present invention. However, the scope of the present invention should be determined by the following claims.

What is claimed is:

1. A sensor fusion system comprising:
    a plurality of detecting units, each of which detects a data value of a given data kind;
    a plurality of probability distribution computing units, each of which computes a probability distribution of the data value detected by a corresponding detecting unit included in the plurality of detecting units, wherein the probability distribution of the data value indicates likelihood to a true value of the given data kind, and then outputs the computed probability distribution; and
    a synthetic determining unit that estimates a most likely data value of the given data kind based on the probability distributions outputted from the plurality of probability distribution computing units, wherein
    each of the plurality of probability distribution computing units comprises a probability distribution converting unit, which converts the data value detected by the corresponding detecting unit into the probability distribution by using distribution data statistically aggregated from data values detected in past times by the corresponding detecting unit; and
    the probability distribution computed by each of the probability distribution computing units is represented as a sum of a Gaussian distribution and a uniform distribution.

2. The sensor fusion system of claim 1,
    wherein at least one of the probability distribution computing units converts a shape of the computed probability distribution to at least one scalar value and outputs the at least one scalar value,
    the at least one scalar value including one of (i) an average of the Gaussian distribution, (ii) a variance of the Gaussian distribution, and (iii) a normal recognition ratio indicating a ratio between the Gaussian distribution and the uniform distribution, and
    wherein the synthetic determining unit converts the at least one scalar value to the shape of the probability distribution.

3. The sensor fusion system of claim 1,
    wherein at least one of the probability distribution computing units receives information relating to a parameter affecting detection accuracy in the corresponding detecting unit and changes the probability distribution based on the received information.

4. The sensor fusion system of claim 1, wherein each of the probability distribution computing units computes as an output, the probability distribution which is a likelihood statistically computed from previous data values, provided to each of the probability distribution computing units.

5. The sensor fusion system of claim 1,
    wherein the uniform distribution is based on a mis-recognition probability obtained from (i) an actual detection result or (ii) a definition or property of each of the detecting units.

6. The sensor fusion system of claim 1, wherein the statistically aggregated distribution data shows a relationship between a true value of a corresponding data kind and the data values detected in the past times by the corresponding detecting unit.

7. A vehicle control system mounted in a vehicle, comprising:
    a sensor fusion system that includes
        a plurality of detecting units, each of which detects a data value of a given data kind,
        a plurality of probability distribution computing units, each of which computes a probability distribution of the data value detected by a corresponding detecting unit included in the plurality of detecting units, wherein the probability distribution of the data value indicates a likelihood to a true value of the given data kind, and then outputs the computed probability distribution, and
        a synthetic determining unit that estimates a most likely data value of the given data kind based on the probability distributions outputted from the plurality of probability distribution computing units, wherein
    each of the plurality of probability distribution computing units comprises a probability distribution converting unit, which converts the data value detected by the corresponding detecting unit into the probability distribution by using distribution data statistically aggregated from data values detected in past times by the corresponding detecting unit;
    at least one control unit that receives the estimated most likely data value that is given from the synthetic determining unit and controls an in-vehicle device based on the received most likely data value of the given data kind; and
    the probability distribution computed by the each of the probability distribution computing units is represented as a sum of a Gaussian distribution and a uniform distribution.

8. The vehicle control system of claim 7,
    wherein the synthetic determining unit estimates the most likely data value of the given data kind that includes at least one of a road surface state, a solar radiation amount, a position of an object, a speed of the object, a size of the object, a type of the object, wherein the object includes a preceding vehicle, and
    wherein the at least one control unit includes at least one of
    a control unit of an information providing device for providing information to a driver of the vehicle;
    a control unit of a warning device,
    a control unit of a traveling device for controlling a vehicle traveling state,
    a control unit of a driving-state control device for controlling a state of driving operation device, and a control unit of an occupant protecting device for protecting an occupant.

9. The vehicle control system of claim 7,
wherein, when the synthetic determining unit gives the estimated most likely data value to the at least one control unit, the synthetic determining unit also gives reliability data indicating reliability in the estimated most likely data value.

10. The vehicle control system of claim 9,
wherein the reliability data includes at least one of
an error probability in the estimated most likely data value,
a correct answer probability in the estimated most likely data value,
a probability distribution in the estimated most likely data value,
an average of the probability distribution,
a variance of the probability distribution, and
a normal recognition ratio.

11. The vehicle control system of claim 7,
wherein at least one of the probability distribution computing units converts a shape of the computed probability distribution to at least one scalar value and outputs the at least one scalar value,
the at least one scalar value including one of (i) an average of the Gaussian distribution, (ii) a variance of the Gaussian distribution, and (iii) a normal recognition ratio indicating a ratio between the Gaussian distribution and the uniform distribution, and
wherein the synthetic determining unit converts the at least one scalar value to the shape of the probability distribution.

12. The vehicle control system of claim 7,
wherein at least one of the probability distribution computing units receives information relating to a parameter affecting detection accuracy in the corresponding detecting unit and changes the probability distribution based on the received information.

13. The sensor fusion system of claim 7, wherein the statistically aggregated distribution data shows a relationship between a true value of a corresponding data kind and the data values detected in the past times by the corresponding detecting unit.

* * * * *